(12) United States Patent
Bernabeu-Auban et al.

(10) Patent No.: US 9,300,532 B2
(45) Date of Patent: Mar. 29, 2016

(54) AUTOMATING DEPLOYMENT OF SERVICE APPLICATIONS BY EXPOSING HOSTING ENVIRONMENT CONSTRAINTS

(75) Inventors: Jose Bernabeu-Auban, Sammamish, WA (US); Yousef A. Khalidi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 12/258,156

(22) Filed: Oct. 24, 2008

(65) Prior Publication Data

US 2010/0106812 A1 Apr. 29, 2010

(51) Int. Cl.
*G06F 9/44* (2006.01)
*H04L 12/24* (2006.01)
*H04L 29/08* (2006.01)
*G06F 9/445* (2006.01)

(52) U.S. Cl.
CPC .............. *H04L 41/0806* (2013.01); *G06F 8/10* (2013.01); *G06F 8/20* (2013.01); *G06F 8/35* (2013.01); *G06F 8/36* (2013.01); *G06F 8/60* (2013.01); *H04L 41/0843* (2013.01); *H04L 41/0846* (2013.01); *H04L 67/10* (2013.01); *H04L 67/34* (2013.01)

(58) Field of Classification Search
CPC . H04L 41/08; H04L 41/0803; H04L 41/0806; H04L 41/0843; H04L 41/0846; H04L 67/34; H04L 67/10; G06F 8/61; G06F 8/60; G06F 8/10; G06F 8/20; G06F 8/35; G06F 8/36
USPC .......... 709/201–205, 213–222; 707/609–639; 719/328–329
See application file for complete search history.

(56) References Cited

U.S. PATENT DOCUMENTS 6,502,131 B1 * 12/2002 Vaid et al. ..................... 709/224
7,313,812 B2 * 12/2007 Robinson et al. ................. 726/1
7,418,718 B2    8/2008 Liu (Continued)

OTHER PUBLICATIONS

Amazon.com, Amazon Elastic Compute Cloud (Amazon EC2)_beta, Jul. 3, 2008. http://www.amazon.com/gp/browse.html?node=201590011.*

(Continued)

*Primary Examiner* — Gregory Todd
(74) *Attorney, Agent, or Firm* — Ben Tabor; Kate Drakos; Micky Minhas

(57) ABSTRACT

Methods, systems, and computer-readable media for automating deployment of service applications by exposing environmental constraints in a service model are provided. In general, the methods are performed in the context of a general purpose platform configured as a server cloud to run various service applications distributed thereon. Accordingly, the general purpose platform may be flexibly configured to manage varying degrees of characteristics associated with each of the various service applications. Typically, these characteristics are provided in the service model that governs the environmental constraints under which each component program of the service application operates. As such, hosting environments are selected and adapted to satisfy the environmental constraints associated with each component program. Adapting the hosting environments includes installing parameters transformed from configuration settings of each component program via map constructs, thereby refining the hosting environment to support operation of the component program.

20 Claims, 6 Drawing Sheets

(56) References Cited

U.S. PATENT DOCUMENTS

| | | | |
|---|---|---|---|
| 7,657,898 B2 | 2/2010 | Sadiq | |
| 7,870,535 B2* | 1/2011 | Rippert, Jr. | G06F 8/20 717/100 |
| 8,160,913 B2* | 4/2012 | Simons | G06Q 10/06 705/7.23 |
| 8,204,717 B2* | 6/2012 | McLaughlin et al. | 702/188 |
| 8,434,093 B2* | 4/2013 | Larimore et al. | 719/312 |
| 2006/0271341 A1* | 11/2006 | Brown et al. | 703/1 |
| 2008/0244688 A1* | 10/2008 | McClain et al. | 726/1 |
| 2009/0193426 A1 | 7/2009 | Bernabeu-Auban | |
| 2009/0271472 A1* | 10/2009 | Scheifler et al. | 709/202 |
| 2009/0276771 A1* | 11/2009 | Nickolov et al. | 717/177 |
| 2009/0300151 A1* | 12/2009 | Friedman et al. | 709/222 |
| 2010/0050172 A1* | 2/2010 | Ferris | 718/1 |
| 2010/0057831 A1* | 3/2010 | Williamson | 709/203 |
| 2010/0058318 A1 | 3/2010 | Bernabeu-Auban | |
| 2010/0083287 A1* | 4/2010 | Maximilien et al. | 719/328 |
| 2010/0106812 A1* | 4/2010 | Bernabeu-Auban et al. | 709/221 |

OTHER PUBLICATIONS

Eilam, et al., "Managing the Configuration Complexity of Distributed Applications in Internet Data Centers", IEEE Communications Magazine, Mar. 2006, pp. 166-177.

Bell, et al., "Configuration Description, Deployment, and Lifecycle Management (CDDLM) Foundation Document", Aug. 7, 2005, 37 pages, Global Grid Forum.

Manoel, et al., "End-to-End Automation with IBM Tivoli System Automation for Multiplatforms", International Business Machines Corporation, Nov. 2005, 296 pages.

Coveney, et al., "A Lightweight Application Hosting Environment for Grid Computing", 8 pages.

"Automated Deployment Services Technical Overview", Aug. 2003, Microsoft Corporation, 29 pages.

* cited by examiner

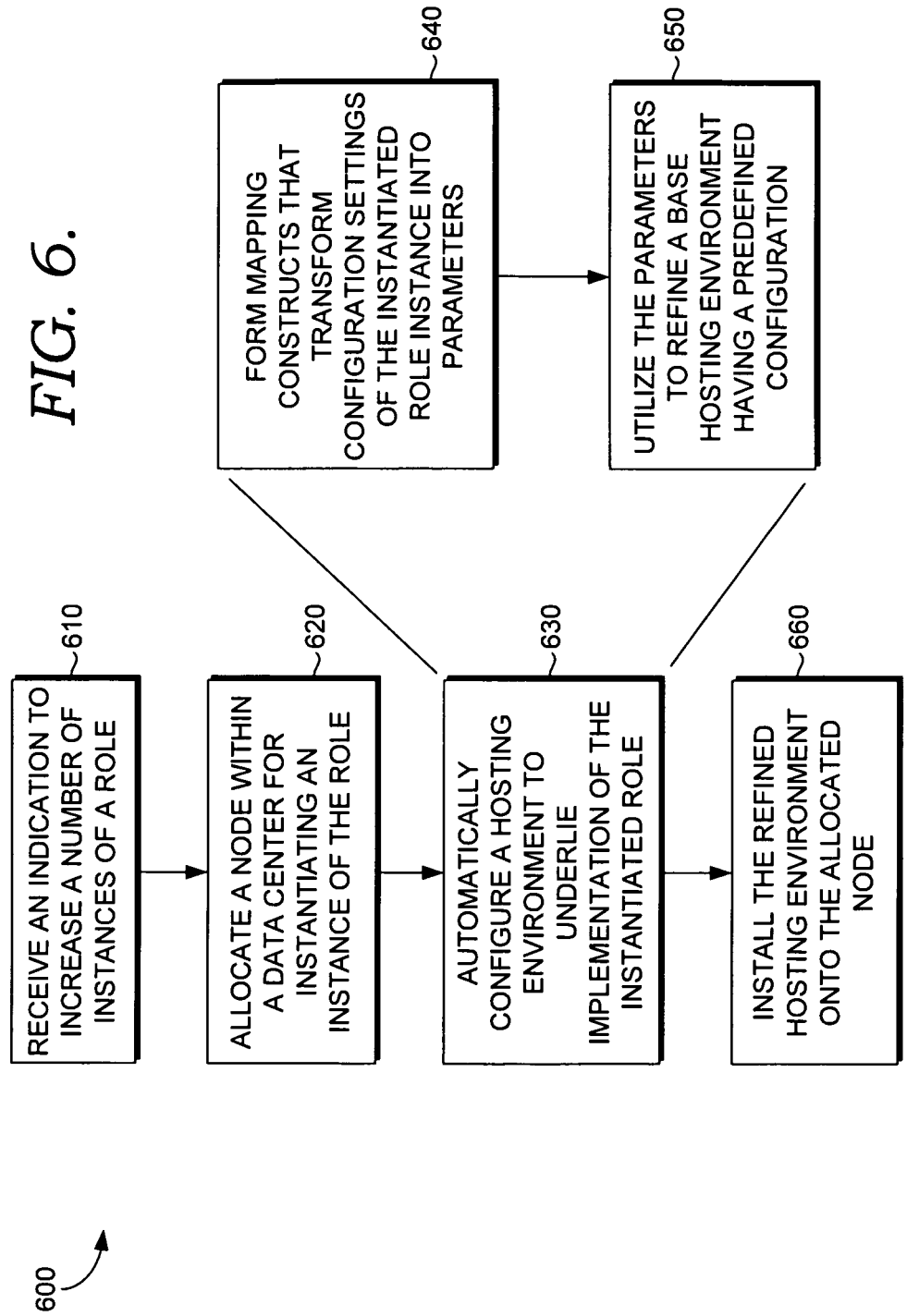

AUTOMATING DEPLOYMENT OF SERVICE APPLICATIONS BY EXPOSING HOSTING ENVIRONMENT CONSTRAINTS

BACKGROUND

Typically, developers write software applications to allow for many degrees of freedom in their configuration. By way of example, these developers are able to leverage these degrees of freedoms by establishing a software application that operates within specific constraints of a particular platform that is provided to support the software application. Thus, these freedoms associated with the software application enable the software application to operate in cooperation with the platform.

In one instance, this configuration of software application may be employed by application-service providers who develop the software application to operate on a platform that is remotely accessible via the Internet. In this instance, the platform executes the software program in such a way that users may remotely manipulate files using the software application. Accordingly, the platform is adapted to establish underlying elements of the software application running thereon to accommodate a current load of the remote usage. The degrees of freedom in the software application allow for scaling up or down these underlying elements and for managing the coordination therebetween. However, because the platform includes a variety of hardware components that are dispersed throughout a data center, the coordination between the underlying elements may be difficult as each element may require a distinct configuration. For instance, the configuration for one of the underlying elements may vary from another underlying element placed on a separate machine. This variation may result from a number of factors, such as a difference in the location of resources of the platform that is required to support operation of the software application.

Current solutions to configure the underlying elements of the software application rely on curators of the platform to manually set up the underlying elements to properly interact with the hardware component on which it is placed. These ad hoc solutions are labor-intensive and error-prone. Further, these shortcomings of manual involvement are exaggerated when the platform is expansive in size, comprising a multitude of interconnected hardware components, that support the operation of a multitude of software applications.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to methods, systems, and computer-storage media having computer-executable instructions embodied thereon that, when executed, perform methods in accordance with embodiments hereof, for automating deployment of service applications by exposing hosting environment constraints in a service model. These hosting environment constraints may be expressed by a developer of a service application, which is capable of being installed as component programs, or roles, in a distributed computing environment. The expression of the hosting environment constraints may take the form of a definition of a role that includes environmental dependencies of the role. These environmental dependencies may include an indicia of a set of concrete application programming interfaces (APIs) that enable access to particular resources for supporting operation of the role. By way of clarification, each role represents an individual class of component that operates in conjunction with other roles of the service application to realize distributed functionality thereof.

Based on the expression of the hosting environment constraints that are associated with the role, a node (e.g., computing device) within a distributed data center may be allocated for placing and instantiating the role thereon. In an exemplary embodiment, the process of instantiating may include abstracting first map constructs from the role definition that transform the environmental dependencies into values that are administered to configuration settings of the role. Then, a hosting environment, to underlie implementation and operation of the role, may be automatically configured utilizing the configuration settings of the role. In a particular embodiment, automatically configuring encompasses the logical steps of transforming the values administered to the configuration settings to parameters via second map constructs, selecting a base hosting environment according to the expression of the hosting environment constraints in the service model, and refining the base hosting environment utilizing the parameters handled by the second map constructs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 6 is a flow diagram showing an overall method for automatically configuring a hosting environment based on a definition of a subject role, in accordance with an embodiment of the present invention.

DETAILED DESCRIPTION

Figure 1:
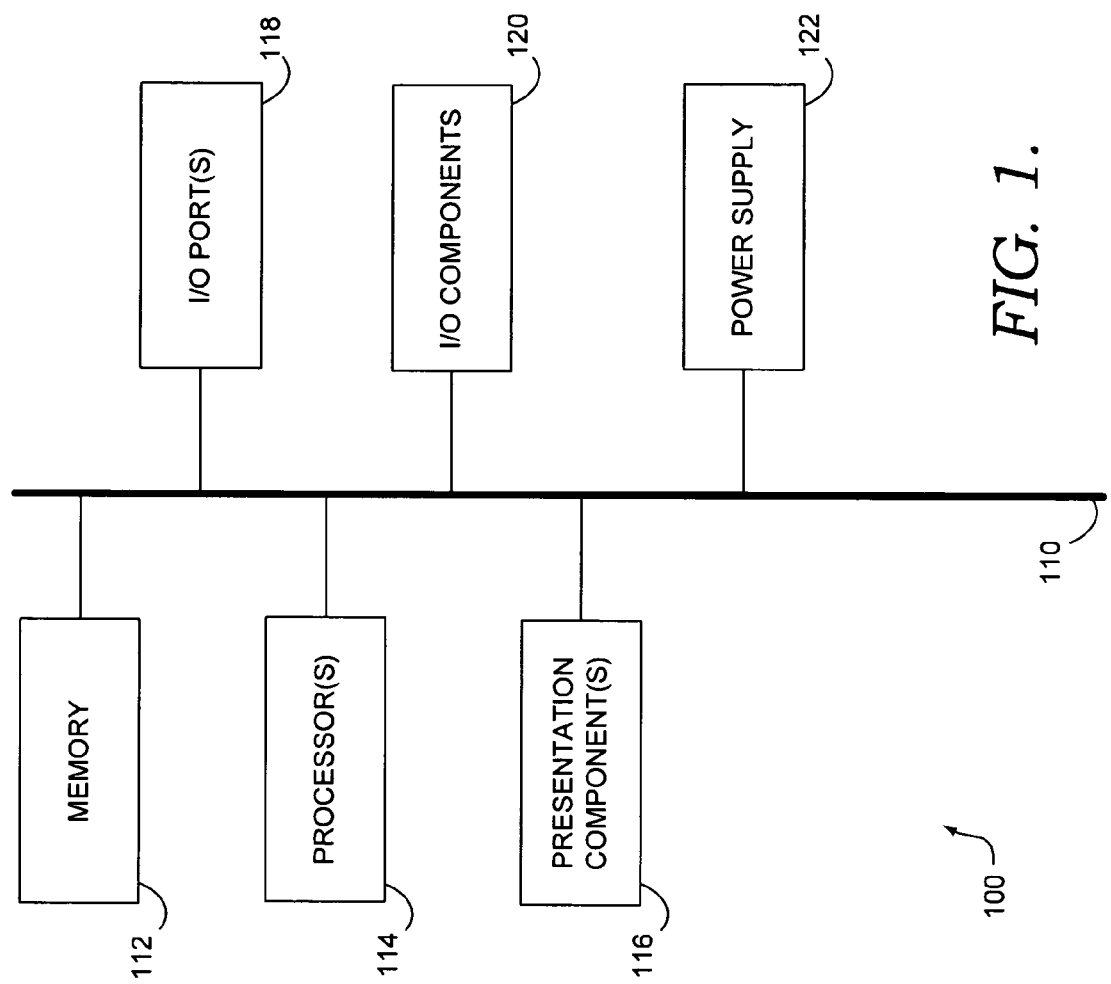
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for automating deployment of service applications by exposing hosting environment constraints in a service model. In general, the methods are performed in the context of a general purpose platform configured as a server cloud to run various service applications distributed thereon. Accordingly, the general purpose platform may be flexibly configured to accommodate and manage varying degrees of characteristics associated with each of the various service applications. In one instance, these characteristics are provided in a service model that govern the constraints under which each component program of the service application operates. As such, hosting environments of the general purpose platform, for underlying the component programs, are adaptable to satisfy the constraints associated with disparate component programs of various service applications.

Accordingly, in one aspect, embodiments of the present invention relate to one or more computer-readable media that have computer-executable instructions embodied thereon. Upon executing the computer-executable instructions, a method for configuring a hosting environment of a data center based on a definition of a subject role of a service application is performed. Initially, the method may include offering a set of base hosting environments. Typically, each of the base hosting environments includes a predefined interface architecture that organizes a set of APIs for accessing resources within the data center. A service model may be received by the data center from the developer. In one instance, the service model conveys definitions of one or more roles of the service application. Generally, the term "roles," as described more fully below, represents component programs that jointly support the functionality of the service application. Upon detecting a trigger event, such as a call to instantiate more instances of a role, the service model is automatically applied to configure the hosting environment, which supports the implementation and operation of a subject role of the roles. In embodiments, applying includes, in no particular order, selecting one of the set of base hosting environments according to the definition of the subject role, and refining the selected hosting environment according to map constructs derived from configuration settings of the subject role. In instances, the configuration settings of the subject role are established by transforming a definition of the subject role into values, via a map construct, and administering the values to the configuration settings. The refined hosting environment may be stored in conjunction with the subject role.

In another aspect, embodiments of the present invention relate to a computerized method for updating a service application operating within a distributing data center based on a service model. In embodiments, the method initially includes, but is not limited to, receiving an indication to increase the number of instances of a role of service application. As mentioned above, the role represents a particular class of component that operates in conjunction with other roles of the service application to realize distributed functionality thereof. By way of example, the indication arises from an event comprising at least one of a change in a remote-usage workload of the service application or one or more nodes of the data center falling offline. Accordingly, these event, and other events contemplated by the invention, may drive the desirability of installing additional roles of the service application within the distributed data center.

Upon receiving the indication, a node within the data center may be allocated for instantiating an instance of the role thereon. Generally, instantiation is carried out in accordance with a definition of the role retained at the service model. In one instance, instantiation is carried out by one or more of the following logical steps, in no particular order: identifying a component program established on the node of the data center; abstracting map constructs from the definition of the role retained in the service model; and utilizing the map constructs to perform the instantiation of the instance of the role at the component program. In one instance, abstracting map constructs from the definition of the role includes transforming environmental dependencies within the role definition into values. In another instance, utilizing the map constructs to instantiate an instance of the role includes administering the values to configuration settings of the component program.

Upon installing the role, a hosting environment is automatically configured to underlie implementation of the instantiated role instance. In an exemplary embodiment, automatically configuring includes forming mapping constructs that transform configuration settings of the instantiated role instance into parameters, and utilizing the parameters to refine a base hosting environment having a predefined configuration. The process of utilizing the parameters to refine a base hosting environment may further include the procedures of selecting the base hosting environment from a set of base hosting environments offered by the data center, where selection is based on the values administered to the configuration settings of the component program, tailoring a hosting environment in accordance with the map constructs associated with the role, and/or stacking the tailored hosting environment onto the selected base hosting environment. As such, the procedure of stacking affects a configuration of the selected base hosting environment. This refined hosting environment may be installed onto the allocated node to provide the installed role with access to various resources within the data center via a set of concrete APIs.

In yet another aspect, embodiments of the present invention relate to a computer system capable of automatically configuring a hosting environment upon instantiating a role instance of a service application within a data center. Generally, the data center includes distributed computing devices. The computer system may include a computer storage medium that has a plurality of computer software components embodied thereon. Initially, the computer software components include a service model, a fabric controller, and an agent of the fabric controller that is locally disposed on a computing device distributed within the data center.

In operation, the service model exposes environmental dependencies of the role instance. The environmental dependencies are inherent within the design of the role and are desirable to support proper functionality of the role once installed on a node of the data center. The fabric controller serves to interpret the service model in order to abstract a first map construct. The first map construct may be configured to transform the environmental dependencies into values that are administered to configuration settings of the role. The fabric controller may additionally serve to allocate one of the distributed computing devices for installation of the role and the hosting environment thereon. The agent, which may be disposed on the allocated computing device, is generally configured for employing a second map construct that transforms the configuration settings of the role into parameters that are utilized automatically to configure a hosting environment to accommodate the particular design, and associated attributes, of the role. In an exemplary embodiment, configuring the hosting environment includes selecting a base hosting environment and automatically refining the base hosting environment utilizing the second map constructs. The refined hosting environment supports the role, in part, by providing APIs that connect the role to resources of the data center that support implementation thereof.

As utilized herein, the phrase "service model" is not meant to be limiting and generally refers to any communication that includes information pertaining to establishing and managing instances of a service model within a data center. In one instance, the service model includes a description of which roles of the service application are to be established, or how the instances of each of the roles are to be installed and activated within the data center. That is, the service model serves as an articulation of which roles should be running for the service application and conditions for where instances of the roles should be installed. By way of example, the service model may indicate the service application including roles A, B, and C, are operably coupled through a certain connection path (e.g., a particular channel within the data center) and indicate environmental dependencies on which operation of the roles A, B, and C rely.

In particular, the phrase "environmental dependencies," as used herein, generally refer to constraints that relate to the design of each of the roles of the service application and the configuration of hosting environments (i.e., underlying the implementation of the roles) in order to satisfy those constraints. Typically, definitions of the roles within the service model are based, in part, on environmental dependencies of each of roles. In embodiments, the environmental dependencies of the roles are specified by a developer of the service application. In other embodiments, the environmental dependencies are automatically derived from a definition of a role, or manually written by a curator of the data center or third-party entity.

The constraints embodied in the environmental dependencies may be based on a plurality of criteria. In one instance, the environmental dependencies relate to concrete APIs that are to be available to the role of the service application upon instantiation, thereby ensuring proper functionality within the distributed hosting environment. In another instance, the environmental dependencies relate to resources to be at the disposal of the role during its execution. In embodiments, the resources disposed to the role are made accessible via the concrete APIs. In yet another instance, the environmental dependencies relate to communication paths between the role and other roles that are remotely dispensed throughout the data center. The other roles, upon which the subject role depends for proper operation, may be an instance of the same role, an instance of another role of the same overarching service application, or may be a role associated with a service application distinct from the service application supported by the subject role.

Although three different embodiments of the constraints for configuring a hosting environment have been described, it should be understood and appreciated by those of ordinary skill in the art that other types of suitable criteria that facilitate configuring a hosting environment to match the particular characteristics and design of a role are contemplated herein, and that embodiments of the present invention are not limited to those constraints described herein. For instance, the constraints of the environmental dependencies of a role may indicate which components/resources forward inputs to the subject role and which components/resources collect outputs from the subject role. Additionally, the environmental dependencies may reflect a location or identity of the components/resources that are to be in communication with the subject role. Further, the environmental dependencies may expose to the data center APIs and/or channels within the data center that effect the communication to the components/resources.

Generally, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component program of the service application. Typically, the service model delineates how many instances of each of the one or more roles to place within the data center, where each of the instances is a replication of the particular class of components, or role. In other words, each role represent a collection of instances of each class of component, where the service application may have any number of classes of component for carrying out functions thereof. Accordingly, each role represents particular class of component that operates in conjunction with other roles of the service application to realize distributed functionality thereof.

Figure 5:
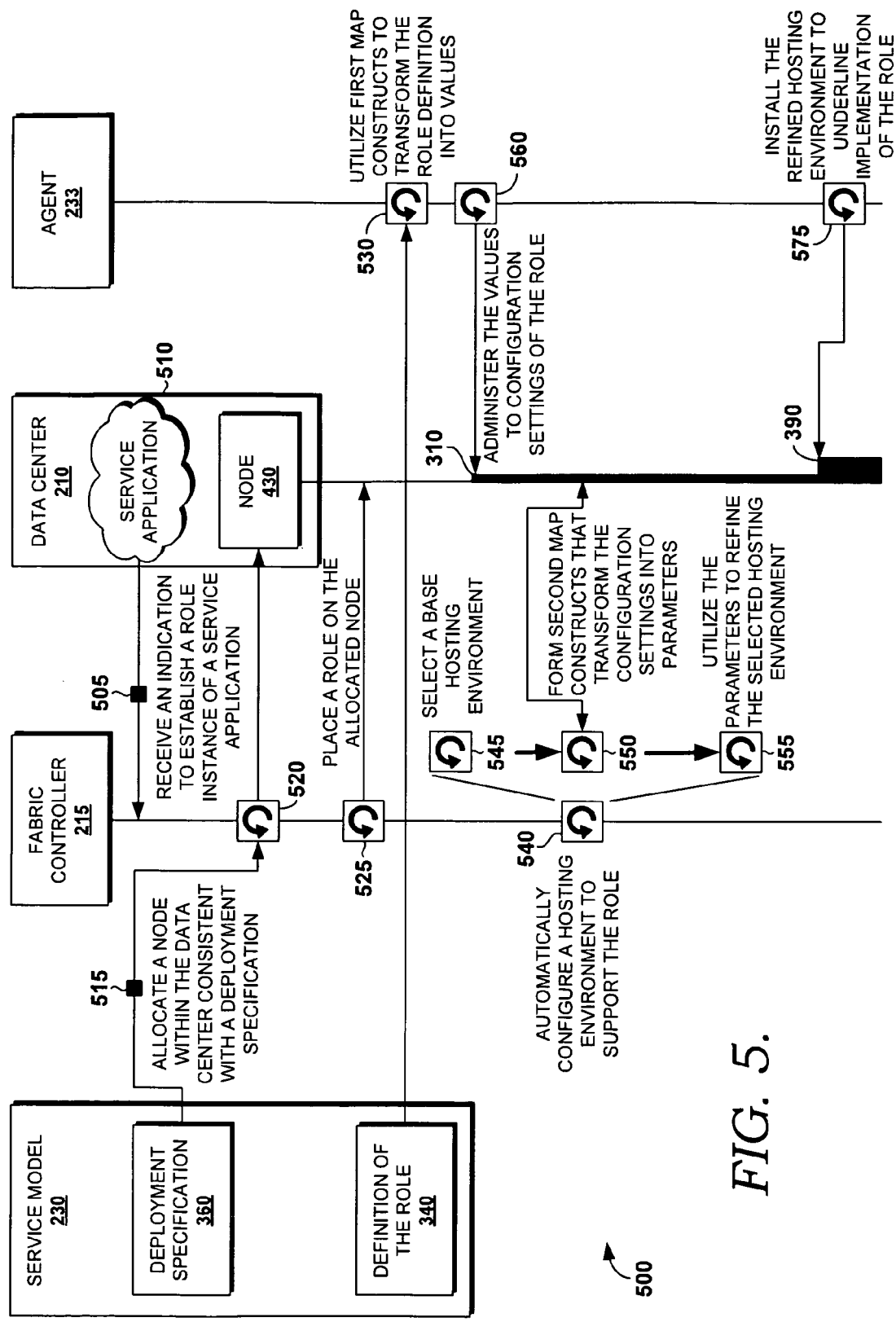
FIG. 5 is an operational flow diagram illustrating a high-level overview of a technique to instantiate a hosting environment and a role to execute thereon, in accordance with an embodiment of the present invention.

The service model, upon being inspected by a fabric controller, discussed more fully below with reference to FIG. 5, provides instructions for installing an instance of each of the roles that make up the service application as well as an implicit description of how to configure a hosting environment. By way of example, upon deployment of the service application within the data center, the data center must place the roles in the data center a particular number of times, in accordance with the service model. Accordingly, if the developer requests, via the service model, that each role is to be placed on at least five fault domains, the service application will be distributed on the data center such that at least five replicas, or instances, of each of the roles is placed on five differing nodes.

Prior to placing the role instances on the nodes within a data center, appropriate nodes are allocated for the purposes of supporting the execution of the role instances. In one instance the allocation is guided by a deployment specification written to the service model. By way of example, the deployment specification may inspect the environmental dependencies of the role to be installed and allocate a node for receiving the role based on the resources and/or APIs available to the node. In another example using the deployment specification to assist allocation, a node may be selected for accommodating a role based on the node's current workload, whether the attributes of the node conflict with dependencies of the role, a security level associated with the node, whether the node may be configured via a hosting environment to satisfy constraints of the service model, any other criteria related to proper operation/communication of the role, or any combination thereof.

Beyond the process of allocating nodes for occupation by roles and associated hosting environments, the deployment specification provides instructions directed to various other aspects of instantiation of the roles. In an exemplary embodiment, the process of instantiation is guided by the deployment specification to place a new component program on a node and install appropriate values to the configuration settings of the component program. Typically, map contracts are utilized to transform the role definition of the service model into the values that are administered to the component program. Upon administration, the component program behaves like a role of the service application.

In other aspects of this embodiment, the instantiation process includes at least, the following logical steps: establishing component programs, or instances, at the allocated nodes; deriving formalized values based on a variety of factors (e.g., properties of the allocated nodes); automatically propagating the formalized values to the instances; and installing the formalized values thereon. That is, in embodiments, the roles are established by deploying (e.g., generating new component programs) component programs on nodes within the data center. Accordingly, the instantiation process facilitates managing the service application.

In another exemplary embodiment, the process of instantiation is guided by the deployment specification to identify as available existing component programs on nodes within the data center and configure the existing component programs on a node. In an exemplary embodiment of identifying available existing component programs, configuration settings within the existing component programs are interrogated to determine whether they are compatible with the design of the role for which they will embody. Typically, configuring encompasses one or more procedures that include the following, in no particular order: identifying a component program established on the node of the data center, abstracting map constructs from the definition of the role retained in the service model, and utilizing the map constructs to perform the instantiation of the instance of the role at the component program. In one instance of this particular embodiment, instantiating the role instance includes installing appropriate values to the configuration settings of the component program such that it behaves as a role. The appropriate values may be transformed from the role definition by the map constructs. The map constructs may also promote administering the values to the configuration settings. Accordingly, the generic component program will take on a personality of the role and operate in cooperation with other roles of the service application.

Although the developer is responsible for creating constraints that govern how replicas of a role are to be established, a curator of the data center may design, deploy, and/or configure instances of the service applications and/or hosting environments within the confines of the constraints. For instance, the curator may build hosting environments that satisfy the constraints of the environmental dependencies of one or more roles. However, in an exemplary embodiment, the fabric controller is responsible for automatically instantiating a role, based on an event, by inspecting the definition of the role on the service model and executing the deployment specification in light of the definition. Moreover, the fabric controller is capable of automatically placing a hosting environment within the data center (e.g., locating the corresponding hosting environments and roles on similar nodes), and automatically configuring the hosting environment to satisfy operating constraints of the instantiated role. As more fully discussed below, the process of automatically configuring is made possible by map constructs that extract data from the instantiated role, and other sources, manipulate the data, and apply the manipulated, or transformed, data to select a base hosting environment and refine it.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as component programs, being executed by a computer or other machine, such as a personal data assistant or other handheld device. Generally, component programs including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
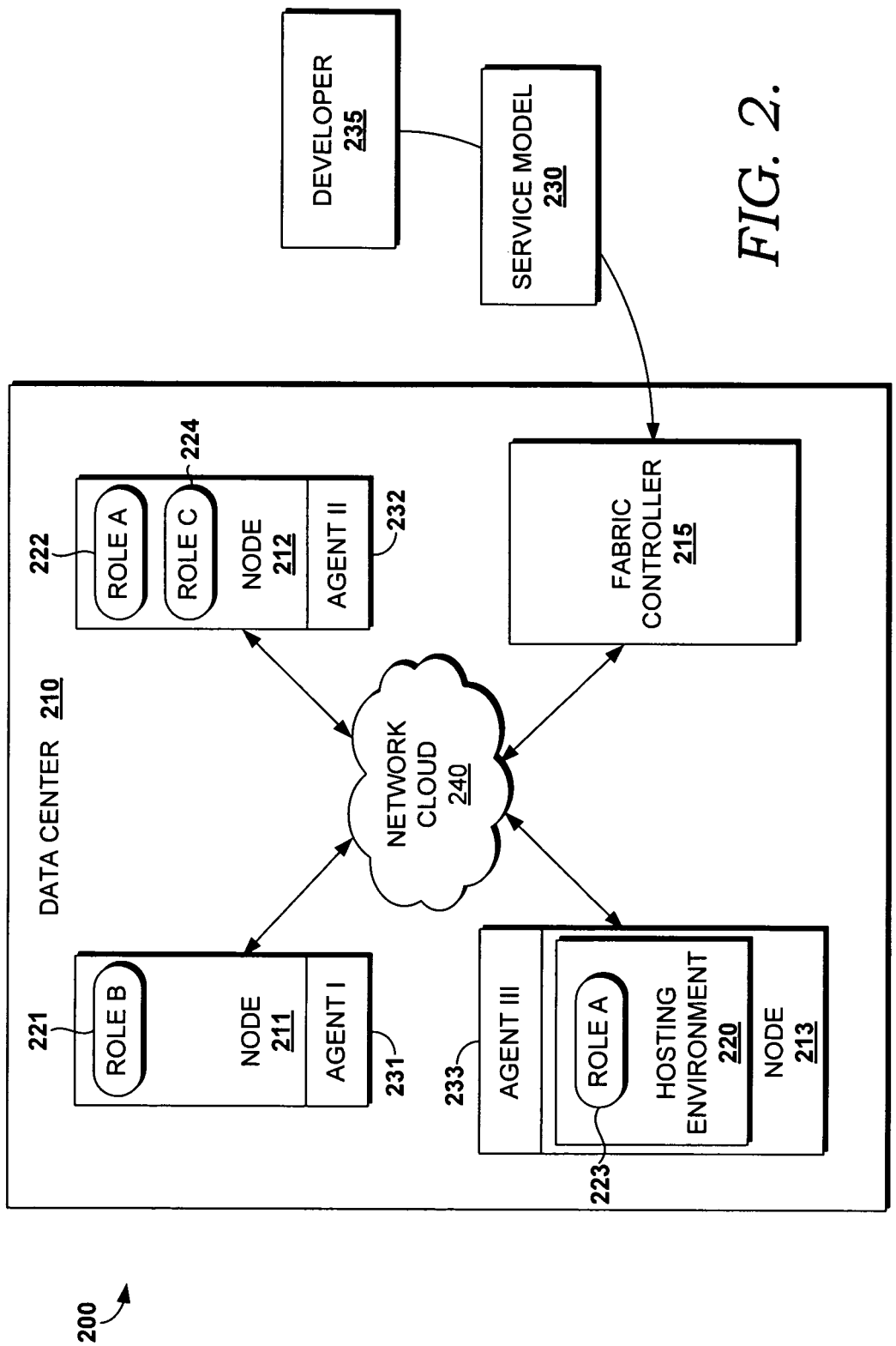
FIG. 2 is a block diagram illustrating a data center, suitable for use in implementing embodiments of the present invention, that is configured to accommodate and support operation of component programs of a service application according to a service model.

Turning now to FIG. 2, a block diagram is illustrated showing a system architecture 200, in accordance with an embodiment of the present invention. The system architecture includes a data center 210 configured to accommodate and support operation of component programs, or instances of roles, of a particular service application according to a service model 230. It will be understood and appreciated by those of ordinary skill in the art that the data center 210 shown in FIG. 2 is merely an example of one suitable for accommodating one or more hosting environments, such as hosting environment 220, and is not intended to suggest any limitation as to the scope of use or functionality of embodiments of the present invention. Neither should the data center 210 be interpreted as having any dependency or requirement related to any single resource, combination of resources, or set of APIs to access the resources (not shown). Further, although the various blocks of FIG. 2 are shown with lines for the sake of clarity, in reality, delineating various components is not so clear, and metaphorically, the lines would more accurately be grey and fuzzy.

The data center 210 includes various resources interconnected via a network cloud 240. These resources, as described herein, may include software components (e.g., fabric controller 215) as well as tangible computing elements, such as nodes 211, 212, and 213. The network cloud 240 interconnects these resources such that instances of service applications (e.g., roles A, B, and C), which may be distributably placed across various physical resources, may recognize a location of other instances in order to establish communication therebetween. In addition, the network cloud 240 facilitates this communication over channels connecting the instances of the service application and any other elements required by the service model 230. The network cloud 240 may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 210 accommodates a distributed system with a plurality of component programs, or instances 221, 222, 223, and 224 of the service application, running independently on processing equipment, or nodes 211, 212, and 213 that execute the component programs, but are interconnected via the network cloud 240. Occasionally, these computational resources can vary in configuration. Accordingly, a developer 235 of the service application, and of the service model 230 that manages aspects of the service application, should recognize these distinctions in the nodes 211, 212, and 213, and implement constraints that effectively identify those computational resources that are properly configured to support execution of a particular node. The constraints are typically written as environmental dependencies of a role and are retained in the service model 230 with a definition of that role.

During instantiation of the role, a computational resource, or node, is allocated for underlying the operation of the role. By way of example only, and not limitation, if the fabric controller detected an event that initiated the instantiation of a role B, such as the instance 221 of role B, each of the available nodes 211, 212, and 213 within the data center 210 would be inspected to ascertain a configuration thereof. In an embodiment, the configuration may include the resources located within the node. In other embodiments, the configuration may refer to other computing attributes of the node, such as APIs or preexisting channels that enable communication paths to remote resources or instances of the service application. If the configuration of the node (e.g., node 211) and the definition of the role align, then the node is deemed compatible and may be allocated for placement of the instance 221 of role B. Accordingly, by performing a pre-instantiation filtering process, the fabric controller 215 ensures that the constraints of a subject role are satisfied by an allocated node. This procedure advantageously allocates those nodes that can properly support the operation of the role instance.

With continued reference to FIG. 2, the nodes 211, 212, and 213 are typically operable coupled with each other via the channels established across the network cloud 240. As discussed herein, the term "node" is not meant to be limiting, but to encompass all forms of computing devices, such as, for example, a personal computer, a desktop computer, a laptop computer, a handheld device, a mobile handset, consumer electronic device, and the like. In one aspect, the node represents a computing device of a plurality of distributed computing devices interconnected via the network cloud 240. Generally, these distributed computing devices are capable of executing a plurality of instances of various roles of the service application. By way of example, a particular node may be capable of accommodating two or more hosting environments that each support role instance(s). These role instances may run on the node in complete isolation (i.e., imposing a high level of security on the service application), in partial communication with other roles, or in an interactive state with one or more other roles of the service application.

In embodiments, the data center 210 may include any number of the physical resources listed above, and may include any collection of computing devices, or other machines capable of executing the instances 221, 222, 223, and 224 of the roles A, B, and C of the service application. Additionally, one or more of the physical resources above can further include the fabric controller 215 residing thereon to deploy, access, and manage the service application via wired or wireless network paths through the data center 210.

In addition, the fabric controller 215 may interact with localized agents, such as agents I 231, II 232, and III 233, distributed on the computational resources themselves. Generally, these extensions of the fabric controller 215 may be located on each of the nodes 211, 212, and 213. In embodiments, the "agent" refers to a software element that is charged with, at least, initiating the role by administering values to the configuration settings of the role. The agent may take on other aspects of instantiating instances of roles based on a division of responsibilities between the agents I 231, II 232, and III 233 and the fabric controller 215. Accordingly, although steps of the instantiation process of a role instance, and the process for configuring of a hosting environment, are split between the fabric controller 215 and the agents I 231, II 232, and III 233, these divisions of steps are for discussion purposes only and should not be interpreted as implying any particular designation of responsibility for implementing steps of these processes. Accordingly, either one of the fabric controller 215, any of the agents I 231, II 232, and III 233, or any combination thereof, is considered as capable of implementing all the steps of either of the instantiation process or the process for configuring a hosting environment.

Further, it should be noted that embodiments of the present invention are not limited to implementation on such physical resources illustrated in FIG. 2, but may be implemented on any of a variety of different types of computing devices and equipment within the scope of embodiments hereof. In other words, illustrated resources of the data center 210 depict an exemplary configuration only that is intended for discussion purposes only; accordingly, any suitable layout of resources (e.g., nodes, agents, fabric controller(s)) known in the computing industry may be used and is contemplated by the present invention.

However, the exemplary resources of the data center 210 serve to introduce the concept of configuring a hosting environment for a particular role. Initially, the developer 235 is allowed to specify, for each role of the service application, the hosting environment configuration that properly supports it. Accordingly, the service model 230 serves as a vehicle to express this specification of the hosting environment. In one instance, the developer 235 is able to express the hosting environment configuration for a role as environmental dependencies of roles within a role definition. In another instance, the expression of the hosting environment is based, in part, on a generic programming model of the data center 210, that is revealed to the developer 235. In general, the generic programming model includes a functional architecture of the data center 210 and the heuristics that govern operation of roles and hosting environments installed within the functional architecture. In this way, the configuration for a hosting environment is substantially set from the general configuration for the role. This role definition may be interpreted by the fabric controller 215 upon receiving the service model 230 at the data center 210. Upon interpreting the role definition, the fabric controller 215 may automatically configure the hosting environment that satisfies the environmental dependencies of the role, while the agent may install the configured hosting environment to the appropriate node.

By way of example, with reference to FIG. 2, the service model 230 may include a definition of role A. The fabric controller 215 may receive the service model 230 and interpret the role A definition. Upon interpretation, the fabric controller 215 may allocate the node 213 for placing an instance 223 of role A thereupon, in accordance with the role definition. The agent III 233, disposed on the node 213 may launch the instantiation process for role A and install the instance 223 of role A based on the role A definition. The fabric controller 215 may further inspect the role A definition to automatically configure the hosting environment 220 to support the instance 223 of role A. This configured hosting environment 220 may be installed on the node 213, or any other node or combination of nodes, to underlie the operation of the instance 223 of role A. Accordingly, the hosting environment 220, configured according to environmental dependencies of the role A, facilitates communicating with other role instances and providing access to computational resources to allow the role A to function properly within the data center 210.

Figure 3:
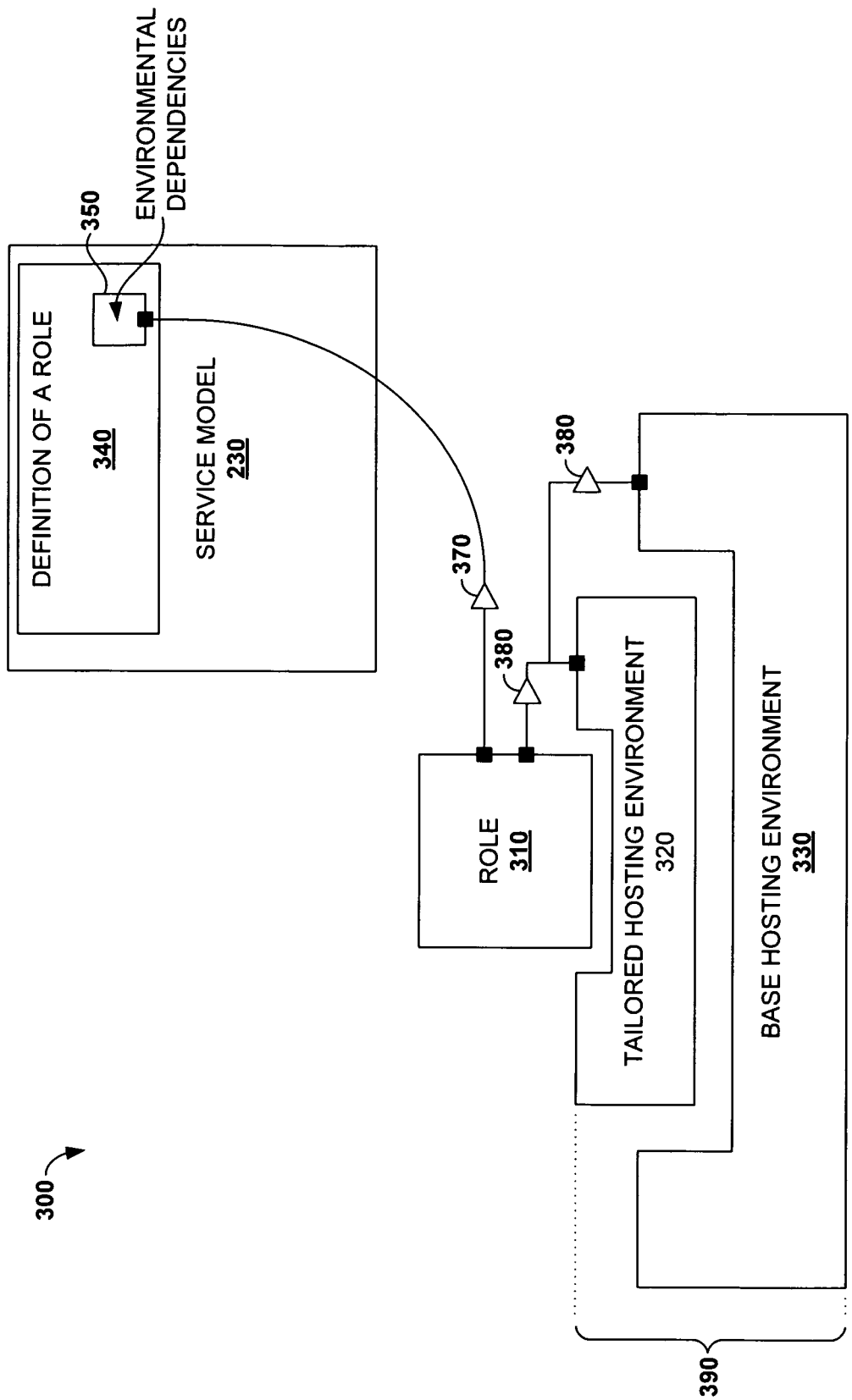
FIG. 3 is a graphical representation of an exemplary refined hosting environment, in accordance with an embodiment of the present invention.

Turning to FIG. 3, FIG. 3 is a graphical representation of an exemplary refined hosting environment, in accordance with an embodiment of the present invention. Initially, the process of refining a hosting environment includes selecting from a base set of hosting environments. In embodiments, each of the set of base hosting environments includes fixed attributes, such as concrete APIs that place resources at the disposal of a role 310. These base hosting environments generally include a predefined architecture and can be used to support the role 310 without other additional set-up.

Further, the data center may provide various types of hosting environments within the set of base hosting environments from which to select. In one instance, one of the set of base hosting environments may be a native hosting environment. The native hosting environment may include a basic set of APIs to retrieve a state of all resources requested for the particular role 310, plus other APIs that do not impact other resources on the node/data center other than those obtained for access by the role 310 (e.g., Win32 API set). In a second instance, one of the set of base hosting environments may be a common language runtime (CLR) environment. The CLR environment may include a basic set of APIs to isolate the running code within a resource-filled sandbox. Beyond the basic set of APIs, other APIs may be available when they do not impact resources outside of the sandbox. In a third instance, one of the set of base hosting environments may be an active server pages (ASP) environment. The ASP environment may comprise a basic environment which sets up ASP-.NET endpoints and resources out of predefined settings in the role 310. Accordingly, in instances, the ASP environment may be an extension to the CLR environment. In a fourth instance, one of the set of base hosting environments may be a whole machine hosting environment. In the embodiment of the whole machine hosting environment, code of the role 310 assumes it has available a whole machine, or node. As such, this type of environment may be useful for deployments of whole operating system images carrying their own specialized applications.

It should be understood that the listed set of base hosting environments above is exemplary in nature. Thus, although not listed, other hosting environments known to those of ordinary skill in the art are contemplated by the present invention. As such, the platform of the present invention provides substantial freedom to a developer of the service model in selecting the base hosting environment for which they are going to build a particular component program, allowing for selection of an environment best suited to the environment dependencies 350 of the particular role 310.

In embodiments, each of the set of base hosting environments inherently provides a different level of security for the role 310. In instances, the level of security of a selected base hosting environment 330 relates to a configuration of the environment and the isolation it provides the role 310 from other components, resources, or APIs established within the data center. Accordingly, the base hosting environment 330 may be selected, as more fully discussed above, by way of environmental dependencies 350 within a definition of a role 340 maintained by the service model 230, and/or by way of a level of security specified for the service application. In other embodiments, the base hosting environment 330 may be from a set of base hosting environments offered by the data center in accordance with the values administered to the configuration settings of the role 310 via a map construct 370.

The refining process may further include stacking a tailored hosting environment 320 onto the selected base hosting environment. In general, stacking allows for defining an extension of the base hosting environment 330. In one instance, stacking includes configuring the selected base hosting environment 330 according to map constructs derived from configuration settings of the subject role 310. Initially, configuring includes tailoring a hosting environment 320 in accordance with the map constructs 380 associated with the subject role 310. This tailored hosting environment 320 may be stacked onto the selected base hosting environment 330, thereby affecting a configuration of the selected base hosting environment 330. In embodiments, the stacked tailored hosting environment 320 and the base hosting environment 330 are merged to form a refined hosting environment 390.

In another embodiment, the refining process may include adjusting parameters of the selected base hosting environment 330 utilizing map constructs 380.

That is, the refined hosting environment 390 is set up by parameters that are established/assembled based on the configuration settings of the role 310 via the map constructs 370. In one instance, a single map construct 380 is applied for each parameter. Accordingly, each of the parameters is based on value(s) administered to the configuration setting of the role 310 via the map constructs 370. Thus, the map constructs 380 effectively expose a configuration of the role 310 to the hosting environments 320 and 330 in order to properly implement the role 310.

By applying the map constructs 380 to the base hosting environment 330, new parameters may be derived to refine the base hosting environment 330, or to extend the base hosting environment 330 by submitting various definitions of the role 310. Accordingly, the map constructs 380 impose restrictions on the configuration of the hosting environments 330 and 320 based on characteristics, or environmental dependencies 350, of the role 310. In addition, the map constructs 380 may communicate which resources the role 310 should access during normal operation, and implement restriction on the hosting environments 330 and 320 based on the accessible resources. The term "restrictions," as used hereinabove, generally refer to rules or heuristics that the refined hosting environment 390 should follow when underlying operation of the role 310.

A concrete implementation of the role 310 typically depends on a concrete set of APIs and a runtime environment supporting its execution, such as resources of a data center made available via the APIs. In addition, the APIs provide for managing the resources that the role 310 will interact with. In other embodiments, the refined hosting environment 390 provides APIs to communicate with other roles of the service application. As such, in operation, the refined hosting environment 390 determines which of a set of concrete APIs, established during refinement, the role 310 has at its disposal, as well as the set of resources the refined hosting environment 390 makes available to the role 310. In instances, the set of concrete APIs promotes the interaction with, and access to, the resources of the hosting environment during instantiation as well as normal operation. In embodiments, resources may include CPU time, bandwidth in the network, local disc memory, main memory, and the like.

In general, the phrase "map constructs," is not meant to be limiting and may encompass any element capable of driving the configuration of the refined hosting environment 390 out of the configuration for the role 310 which runs on it, or driving the configuration of the role 310 out of the environmental dependencies 350 provided in the definition of the role 340. In embodiments, the map constructs 370 and 380 include a function that takes a manual input and automatically creates a configurable output to the data center. In other embodiments, the map constructs 380 are capable of automatically accepting as inputs the configuration settings aligned to the role 310 and automatically transforming the values of the configuration settings into parameters that are to be placed in the hosting environments 320 and 330. That is, the map constructs 380 determines what parameters to give to the hosting environments 320 and 330 based on the parameters of the role 310 by manipulating/computing the configuration for the refined hosting environment 390 based on the configuration of the role 310 it is designed to support.

In one instance, the developer or fabric controller is allowed to compose these map constructs 370 and 380 to configure a program component into the role 310 based on the service model 230 and to configure the refined hosting environment 390 to properly operate with the service application to enable compatibility. In one instance, composing involves extracting a design of the role 310 info (e.g. functional aspects of a role) and from the definition of the role 340. As such, based on the definition of the role 340, the developer can construct a custom hosting environment for the role 310.

Figure 4:
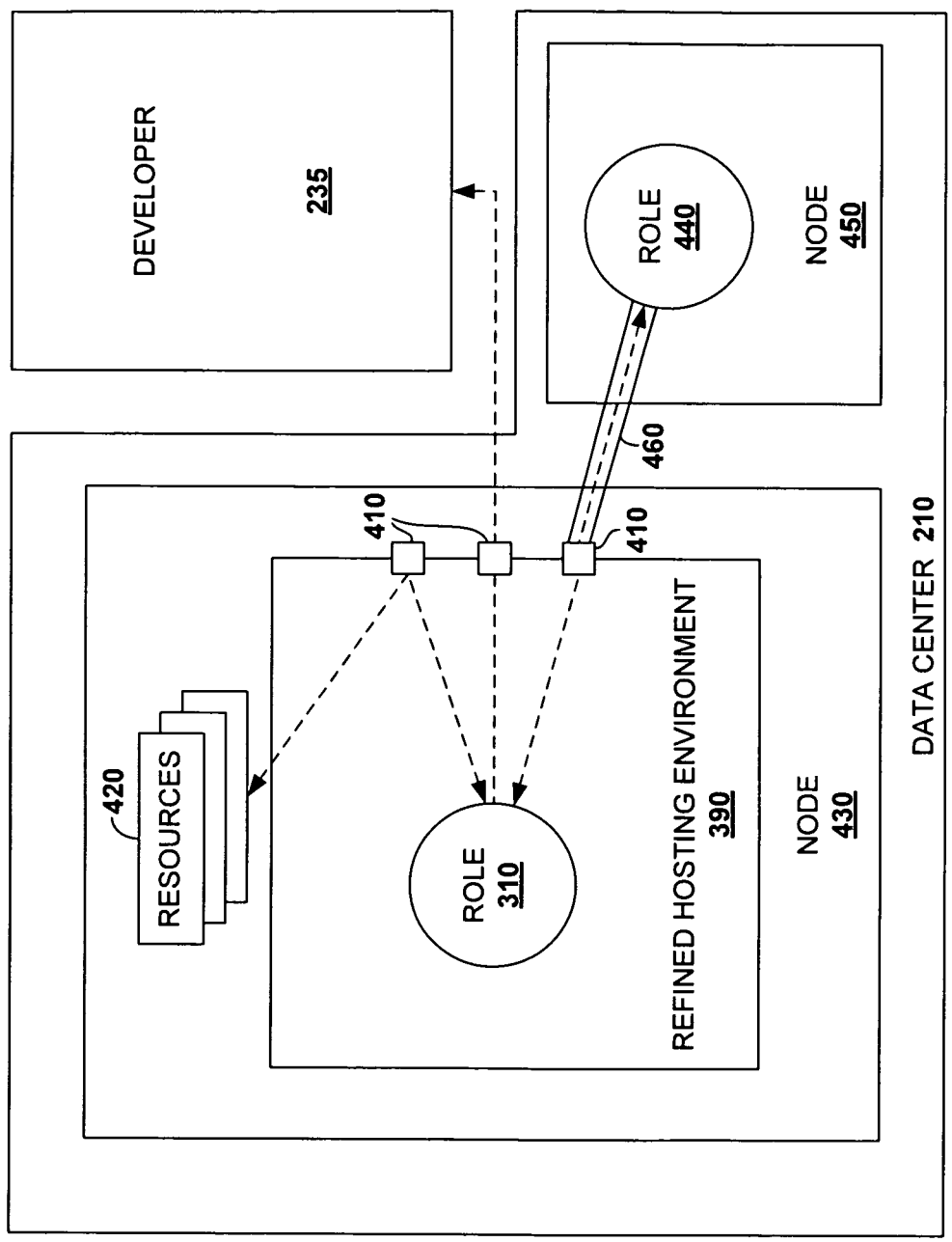
FIG. 4 is a block diagram of an exemplary refined hosting environment, configured according to design aspects of a role, for facilitating proper operation of the role within the data center, in accordance with an embodiment of the present invention.

Referring to FIG. 4, a block diagram of an exemplary refined hosting environment 390, configured according to design aspects of the role 310, for facilitating proper operation of the role 310 within the data center 210, is shown, in accordance with an embodiment of the present invention. As discussed above, the stacked tailored and base hosting environments may generate a refined hosting environment 390 that is specifically configured to support operation of an instance of the role 310. As illustrated, the refined hosting environment 390 is placed on the same node 430 as the role 310. Typically, the refined hosting environment 390 encompass a set of concrete APIs 410 that are at the disposal of the instantiated role 310. These APIs 410 may provide the role with access to various items in the data center 210 that are utilized to support proper implementation and normal functionality of the role 310. In one instance, the set of concrete APIs 410 facilitate communication with resources 420 accommodated on the node 430, or other nodes. In another instance, the set of concrete APIs 410 facilitate communication with other role instances 440 instantiated within the data center 210. That is the set of concrete APIs 410 makes other instances of the role 310, instances of other roles 440 of the service application, accessible to the instantiated role 310. These instances of the service application may be located on the same node 430 as the role 310, or on other nodes (e.g., node 450) of the data center 210.

Communicating to other instances of the role 440 may include defining channels 460 within the data center 210 that are to be utilized as communication paths between the installed instances of differing roles or of instances of the same role. These channels 460 may be established in the data center upon instantiation of the role 310, may be set up during the selection and refinement of the refined hosting environment 390, or may be preexisting and expressed to the role 310 to enable communication between the expansively placed instances 310 and 440. In addition, the process of defining channels 460 may include administering parameters to the configuration settings of the placed instances 310 and 440 such that they are able to recognize communication paths, and the APIs 410 that make the communication paths accessible. Accordingly, the role 310 understands how many instances of the service application are available, and the location of the instances, even when the instances are being dynamically installed and removed.

In embodiments, the refined hosting environment 390 may encompass interactive APIs 410 that reveal to the developer 235 of the service application information. By way of example, the information may include a configuration of the stacked tailored and base hosting environments, or the resources 420 accessible to the instantiated role 310.

Although various different configurations of the APIs 410 have been described, it should be understood and appreciated by those of ordinary skill in the art that other types of suitable APIs that provide access or information to any number of various items or entities, respectively, may be used, and that embodiments of the present invention are not limited to those APIs 410 described herein.

With reference to FIG. 5, an operational flow diagram illustrating a high level overview is shown illustrating a technique 500 to instantiate the refined hosting environment 390 and a role 310 to execute thereon, in accordance with an embodiment of the present invention. Initially, an indication to establish an instance of a role of a service application is conveyed from a service application 510 running in the data center 210. This indication is generally received by the fabric controller 215. As discussed above, the fabric controller 215 performs various management operations for supporting the service application 510, such as deploying instances of roles, in accordance with embodiments of the present invention. Typically, the fabric controller 215 runs on top of a processing unit coupled to a computer storage medium within the data center 210. However, this exemplary fabric controller 215 is but one example of a suitable software construct that may be implemented to carry out aspects of the present invention, and is not intended to suggest any limitation as to the scope of use or functionality of the invention.

The service model 230 may allocate a node 430 within the data center 210, consistent with an indication 515 from the deployment specification 360, for supporting the instance of a role 390. This may be performed at process 520 implemented by the fabric controller 215. As briefly discussed above, the service model 230 is generally an interface blueprint that provides instructions for managing component programs, such as the role instance 310, of the service application 510. The service model 230 acts to guide the fabric controller 215 in coordinating activities between the deployed component programs upon deployment to distributed locations throughout the data center 210. These locations are typically established within the confines of the deployment specification 360 within a service model 230. In addition, the service model 230 includes specifications that identify such aspects of managing the service application 510 as which map constructs to employ during instantiation, which resources to utilize during propagation of component programs, which channels to utilize as communication paths between component programs, and any other information that describes the particular way service application 510 will be executed at the data center 210.

The service model 230 may include the deployment specification 360 that manages the installation of the role instance 310 via the process 525. Instantiation initially includes placing the instance of the role 310 on the allocated node 430. Instantiation may further include utilizing a first map construct to transform environmental constraints of the role 310, stored at the definition of the role 340, into values. This is indicated at process 530. As indicated at process 560, these values may be administered to the configuration of settings of the role, thereby configuring a program component to act as a part of the service application 510. Accordingly, the service model 230 instructs the proper installation of instances of roles to support the service application 510.

Upon, or concurrent with, instantiation of the role 310, the fabric controller 215 may carry out process 540 for automatically configuring a hosting environment 390 to support the role 310. The process 540 may include a variety of procedures, including procedures 545, 550, and 555. Procedure 545 involves selecting a base hosting environment from a set of base hosting environments made available by the data center 210. Procedure 550 involves forming second map constructs that transform the configuration settings of the role 310 into parameters. In other embodiments, parameters within the deployment specification 360 are used by the fabric controller 215 during establishment of the refined hosting environment 390. As discussed above, the parameters of the deployment specification 360 may be partially based on the constraints received from an entity responsible for designing the service application, such as the developer. Further, the process of forming and applying the map constructs may be guided by the deployment specification 360. As indicated at procedure 555, these parameters may be utilized to refine the selected hosting environment to generate a refined hosting environment 390 that satisfies environmental constraints of the role 310.

In embodiments, an agent 233 acting as a localized extension of the fabric controller 215 may carry out the process 575. Generally process 575 involves installing the refined hosting environment 390 onto the allocated node 430. In operation, the installed refined hosting environment 390 serves to underlie operation and implementation of the role 310. Although various differing processes and procedures for instantiating the role 310 and for refining a hosting environment 390 to support operation of the role 310 have been described, it should be understood and appreciated by those of ordinary skill in the art that other types of suitable processes that generate a hosting environment based on specifications of the role may be used, and that embodiments of the present invention are not limited to those particular steps described herein.

Accordingly, any number of steps may be employed to achieve the desired functionality within the scope of embodiments of the present invention. Although the various steps of FIG. 5 are shown with lines for the sake of clarity, in reality, delineating various components is not so clear, and metaphorically, the lines would more accurately be grey or fuzzy. Further, although some steps of FIG. 4 are depicted as single processes, the depictions are exemplary in nature and in number and are not to be construed as limiting (e.g., although only three procedures 545, 550, and 555 are shown, many more may be used in conjuncture to comprise the process 540).

Turning now to FIG. 6, a flow diagram 600 is shown illustrating an overall method for automatically configuring a hosting environment based on a definition of a subject role. The method to automatically configure a hosting environment may be triggered upon receiving a request to update a service application operating within a distributing data center. In one instance, as depicted at block 610, an indication is received to increase a number of instances of a role of the service application. This indication may arise from an event that affects the execution of the service application, such as a change in a remote-usage workload of the service application or nodes of the data center falling offline (e.g., resulting from failures of equipment, intentional deactivations based on an update scheme, and the like). As discussed above, the role represents a particular class of components that operate in conjunction with other roles of the service application to realize distributed functionality thereof.

As depicted in FIG. 620, a node within the data center may be allocated for instantiating an instance of the role thereon. In general, the process of allocation is carried out in light of a definition of the role retained at the service model such that the configuration of a node selected for allocation aligns with environmental dependencies of the role instance. Also, the instantiation process is carried out in the context of the role definition. For instance, the instantiation processes may include the following steps: identifying a component program established on the allocated node; abstracting map constructs from the role definition; and applying the map constructs to perform the instantiation of the instance of the role at the component program. In an exemplary embodiment, applying the map constructs to perform the instantiation process includes utilizing the map constructs to transform attributes of the role definition into values and administering the values to configuration settings of the installed role.

Upon setting up the role instance on the allocated node, a hosting environment to underlie implementation of the instantiated role instance may be automatically configuring, where the hosting environment is configured to satisfy the environmental dependencies of the role. This is indicated at block 630. The process of automatically configuring the hosting environment, as described more fully above with reference to FIG. 4, includes the following logical steps, in no particular order: forming mapping constructs that transform the configuration settings of the instantiated role instance into parameters (see block 640); and utilizing the parameters to refine a base hosting environment having a predefined configuration (see block 650). In embodiments, utilizing the parameters to refine the base hosting environment may include selecting the base hosting environment from a set of base hosting environments offered by the data center, wherein the parameters may be derived from the values administered to the configuration settings of the component program. Further, in embodiments, the refinement of the base hosting environment may include tailoring a separate hosting environment in accordance with the map constructs associated with the role, and stacking the tailored hosting environment onto the selected base hosting environment. Accordingly, stacking the two hosting environments affects the configuration of the selected base hosting environment to properly support the instantiated role instance. As depicted at block 660, the refined hosting environment is installed onto the allocated node.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable memory having computer-executable instructions embodied thereon that, when executed, perform a method for configuring a hosting environment of a data center based on a definition of a subject role of a service application, the method comprising:

receiving a service model from a developer that specifies definitions of one or more roles of the service application, wherein the one or more roles include hosting-environment dependencies for implementation on the hosting environment, wherein the hosting environment is a runtime environment comprising Application Programming Interfaces (APIs) that facilitate execution of the one or more roles, and wherein the hosting-environment dependencies include at least one of:

(a) APIs of the runtime environment that are available to the one or more roles upon instantiation;

(b) resources to be at the disposal of the one or more roles during execution; and (c) communication paths between the one or more roles and other roles in the data center;

in response to receiving the service model from the developer, automatically instantiating a subject role of the one or more roles for deployment on the hosting environment via a process comprising:

(a) selecting a node for hosting the subject role in accordance with the hosting-environment dependencies associated with the definitions of one or more roles;

(b) deriving values, via a mapping construct from the definitions specified by the service model, wherein the mapping construct converts the values of the configuration of one or more roles to parameters of the hosting environment; and (c) installing the derived values to the subject role as configuration settings thereof;

is;

in response to receiving the service model from the developer, automatically using the service model to configure the hosting environment to support the implementation and deployment on the hosting environment of the subject role of the one or more roles, wherein automatically using the service model comprises:

(a) selecting one of a plurality of base hosting environments based on, in part, the hosting-environment dependencies associated with the subject role, wherein the base hosting environments include various predefined interface architectures, respectively, to support operation of the subject role; and (b) refining the selected base hosting environment as a function of the values administered to the configuration settings of the subject role, wherein refining the selected base hosting environment includes tailoring a stackable hosting environment in accordance with map constructs associated with subject role such that stacking the stackable hosting environment affects the selected base hosting environment configuration; and at least temporarily assigning the refined hosting environment in association with the subject role.

2. The computer-readable memory of claim 1, wherein the method further comprises placing the refined hosting environment on the node selected for hosting the subject role in order to underlie the operation of the subject role.

3. The computer-readable memory of claim 2, wherein each of the plurality of distributed computing devices is capable of executing a plurality of instances of the one or more roles of the service application, and wherein a particular node of the plurality of nodes is capable of accommodating two or more of hosting environments.

4. The computer-readable memory of claim 1, wherein administering the derived values to configuration settings of the subject role comprises utilizing the map constructs to transform the definition of the subject role in the service model into values that are capable of being installed into the configuration settings of the subject role.

5. The computer-readable memory of claim 4, wherein the definitions of the one or more roles are based, in part, on environmental constraints of each of the one or more roles, and wherein the environmental dependencies of each of the one or more roles are specified by the developer of the service application.

6. The computer-readable memory of claim 5, wherein the environmental dependencies comprise at least one of resources made accessible by the underlying hosting environment on which the subject role depends for proper implementation or other instances of the one or more roles of the service application with which the subject role interacts.

7. The computer-readable memory of claim 6, wherein the deployment specification relies on the environmental dependencies to define which channels, established within the data center, are utilized as communication paths between the placed subject role and the instantiated instances of the one or more roles.

8. The computer-readable memory of claim 6, wherein the environmental dependencies are generated at least in part on interrogating the other instances of one or more roles of the service application to identify configuration settings, wherein the one or more roles are active existing roles on a node.

9. The computer-readable memory of claim 1, wherein the map constructs transform the values administered to the configuration settings of the subject role into parameters that are utilized to configure the tailored stackable hosting environment.

10. The computer-readable memory of claim 1, wherein refining the selected base hosting environment according to map constructs ensures a particular level of security for the subject role supported thereby, and wherein the level of security corresponds with a degree of spatial isolation of the refined hosting environment from other hosting environments installed in the data center.

11. The computer-readable memory of claim 1, wherein the node represents a computing device of a plurality of distributed computing devices interconnected via a network cloud, and wherein the method further comprises using the deployment specification for guiding propagation of instances of the one or more roles throughout the data center by allocating a number of nodes to support operation of the one or more roles respectively.

12. A computerized method for updating a service application operating within a distributed data center based on a service model, the method comprising:
  receiving an indication to increase a number of instances of a role of the service application, wherein the role represents a particular class of components that operate in conjunction with other roles of the service application to realize distributed functionality thereof;
  in response to receiving the indication to increase a number of role instances of the service application, allocating a node within the data center for placing an instance of the role thereon, wherein the allocation is carried out in accordance with a deployment specification retained at the service model, wherein the deployment specification at the service model is generated based at least in part on identifying configuration settings of existing roles on nodes in the data center;
  deriving values as a function of a definition of the role, as provided by the service model;
  administering the derived values to configuration settings of the subject role;
  in response to receiving the indication to increase a number of role instances of the service application, automatically configuring a hosting environment to underlie implementation of the role instance, wherein the hosting environment is a runtime environment comprising Application Programming Interfaces (APIs) that facilitate execution of roles, wherein automatically configuring comprises:
    (a) providing the hosting environment, wherein the hosting environment is initially provided with a predefined configuration of the runtime environment; and
    (b) utilizing the configuration settings to refine the predefined configuration; and
  installing the refined hosting environment onto the allocated node.

13. The computerized method of claim 12, wherein the indication arises from an event comprising at least one of a change in a remote-usage workload of the service application or one or more nodes of the data center falling offline.

14. The computerized method of claim 12, further comprising:
  identifying a component program established on the node of the data center;
  abstracting map constructs from the definition of the role retained in the service model; and
  utilizing the map constructs to instantiate the instance of the role at the component program.

15. The computerized method of claim 14, wherein abstracting map constructs from the definition of the role retained in the service model comprises transforming environmental dependencies within the role definition into values; and wherein utilizing the map constructs to instantiate an instance of the role at the component program comprises administering the values to configuration settings of the component program.

16. The computerized method of claim 15, wherein utilizing the parameters to refine a base hosting environment having a predefined configuration comprises:
  based on the values administered to the configuration settings of the component program, selecting the base hosting environment from a set of base hosting environments offered by the data center;
  tailoring a hosting environment in accordance with the map constructs associated with the role; and
  stacking the tailored hosting environment onto the selected base hosting environment, thereby affecting a configuration of the selected base hosting environment.

17. The computerized method of claim 16, wherein stacked tailored and base hosting environments encompass a set of concrete application programming interfaces (APIs) that are at the disposal of the instantiated role.

18. The computerized method of claim 17, wherein the set of concrete APIs facilitate communication with resources and other role instances instantiated within the data center accessible to the instantiated role.

19. The computerized method of claim 16, wherein stacked tailored and base hosting environments encompass interactive APIs that reveal to a developer of the service application information comprising at least one of a configuration of the stacked tailored and base hosting environments or the resources accessible to the instantiated role.

20. A computer system comprising distributed computing devices for performing a method that automatically configures a hosting environment upon instantiating an instance of a role of a service application within a data center, the computing devices comprising:
  one or more of the computing devices for hosting a service model that exposes environmental dependencies of the role instance;
  one or more of the computing devices for hosting a fabric controller for reading the service model, for allocating one of the distributed computing devices to host the role instance and the hosting environment thereon, wherein the hosting environment is a runtime environment comprising Application Programming Interfaces (APIs) that facilitate execution of the role instance, wherein the allocation is carried out in accordance using a deployment specification included within the service model, for deriving values as a function of a definition of the role instance, as provided by the service model, and for administering the derived values as configuration settings of the role instance;
  one or more of the computing devices for hosting an agent disposed on the allocated node for extracting data from the configuration settings of the role instance, for using the extracted data to automatically select a base hosting environment and a stackable host environment, thereby providing the APIs of the runtime environment to establish communication paths between the role instance and other role instances of the service application that are distributed across the computing devices of the data center.

* * * * *